United States Patent
Cheng et al.

(10) Patent No.: US 10,634,525 B2
(45) Date of Patent: Apr. 28, 2020

(54) DETECTION OF LOCAL PROPERTY CHANGES IN AN OPTICAL SENSING FIBER

(71) Applicant: Nederlandse Organisatie voor toegepast-natuurwetenschappelijk onderzoek TNO, The Hague (NL)

(72) Inventors: Lun Kai Cheng, The Hague (NL); Erwin Johannes Martinus Giling, The Hague (NL)

(73) Assignee: Nederlandse Organisatie voor toegepast-natuurwetenschappelijk onderzoek TNO, The Hague (NL)

( * ) Notice: Subject to any disclaimer, the term of this patent is extended or adjusted under 35 U.S.C. 154(b) by 242 days.

(21) Appl. No.: 15/538,789

(22) PCT Filed: Dec. 23, 2015

(86) PCT No.: PCT/NL2015/050903
§ 371 (c)(1),
(2) Date: Jun. 22, 2017

(87) PCT Pub. No.: WO2016/105196
PCT Pub. Date: Jun. 30, 2016

(65) Prior Publication Data
US 2017/0350735 A1 Dec. 7, 2017

(30) Foreign Application Priority Data
Dec. 23, 2014 (EP) .................................... 14200183

(51) Int. Cl.
*G01D 5/353* (2006.01)
(52) U.S. Cl.
CPC ..... *G01D 5/35358* (2013.01); *G01D 5/35329* (2013.01)
(58) Field of Classification Search
CPC ........... G01D 5/35329; G01D 5/35358; G01D 5/35361; G01D 5/35364
(Continued)

(56) References Cited

U.S. PATENT DOCUMENTS

| | | |
|---|---|---|
| 2002/0025097 A1 | 2/2002 | Cooper et al. |
| 2007/0165238 A1 | 7/2007 | Boyd |

(Continued)

FOREIGN PATENT DOCUMENTS

| | | |
|---|---|---|
| EP | 0983486 A1 | 3/2000 |
| EP | 2792996 A1 | 10/2014 |
| WO | 2011067554 A1 | 6/2011 |

OTHER PUBLICATIONS

Masoudi A et al: "Paper; A distributed optical fibre dynamic strain sensor based on phase-OTDR; A distributed optical fibre dynamic strain sensor based on phase-OTDR", Measurement Science and Technology, IOP, Bristol, GB, vol. 24, No. 8, Jul. 5, 2013.

(Continued)

*Primary Examiner* — Kevin K Pyo
(74) *Attorney, Agent, or Firm* — Banner & Witcoff, Ltd.

(57) ABSTRACT

Local strain and optionally other properties of an optical sensing fiber are detected as a function of position along the optical sensing fiber. A light pulse with a plurality of simultaneous laser modes at mutually different wavelengths is transmitted into the optical sensing fiber. Light produced by backscattering of the light pulse in the optical fiber is fed to a multi-way coupler, via a first and second optical path with different optical path lengths. Intensities of different phase combinations of light from the paths are detected by detectors at the outputs of the multiway coupler. A data processing system computes relative phase values of light from the first and second paths for a series to time points with time delays corresponding to scattering at different positions along the fiber. In an embodiment, inelastically scattered light such as due to Brillouin scattering and/or Raman scattered light is selective passed to the detectors and detected.

15 Claims, 3 Drawing Sheets

(58) Field of Classification Search
USPC .......................... 250/227.14, 227.16, 227.19
See application file for complete search history.

(56) References Cited

U.S. PATENT DOCUMENTS

2007/0171402 A1    7/2007  Watley et al.
2015/0362386 A1*  12/2015  Hagen ................... G01B 11/18
                                                           356/35.5

OTHER PUBLICATIONS

Aug. 11, 2016—International Search Report and Written Opinion of PCT/NL2015/050903.
S.P. Singh et al., "Nonlinear effects in optical fibres; origin, management and applications" Progress in Electromagnetics Research, PIER 73, 249-275, 2007.
Juarez et al., "Distributed Fiber-Optic Intrusion Sensor System, published in Journal of Lightwave Technology", vol. 23, No. 6, Jun. 2005.
Wooler & Crickmore, "Fibre optic sensors for seismic intruder detection", 17th International Conference on Optical Fibre Sensors, Proceedings of SPIE vol. 5855 (SPIE, Bellingham, WA, 2005), pp. 278-281.
Jaaskelainen, "Fiber Optic Distributed Sensing Applications in Defense, Security and Energy", Proceedings of SPIE, vol. 7316, 731606, 2009.
Johannessen et al., "Distributed Acoustic Sensing—A new way of listening to your well/reservoir", SPE 14962, 2012.

* cited by examiner

DETECTION OF LOCAL PROPERTY CHANGES IN AN OPTICAL SENSING FIBER

CROSS-REFERENCE TO RELATED APPLICATIONS

This application is a U.S. National Stage application under 35 U.S.C. § 371 of International Application PCT/NL2015/050903 (published as WO 2016/105196 A1), filed Dec. 23, 2015, which claims the benefit of priority to EP 14200183.3, filed Dec. 23, 2014. Benefit of the filing date of each of these prior applications is hereby claimed. Each of these prior applications is hereby incorporated by reference in its entirety.

FIELD OF THE INVENTION

The invention relates to a detection system for detecting effects of local property changes in an optical sensing fiber as a function of position along the optical sensing fiber. The property be strain, length, pressure or vibration for example. The invention also relates to a method of sensing distributed property changes in an optical sensing fiber.

BACKGROUND

A distributed optical fiber sensor is described in an article by A. Masoudi et al. titled "A distributed optical fibre dynamic strain sensor based on phase-OTDR" and published in Measurement Science and Technology 24 (2013) 085204. Such a fiber sensor may be used in an intrusion sensor with a buried optical fiber. The vibration exerted on the fiber when an intruder walks over the ground above the fiber influences optical propagation in the fiber. It results in local strain (stretching of the fiber). It is possible to detect locations at which this effect occurs in fibers of more than ten kilometer long.

Masoudi et al. describe a measurement system wherein a light pulse from a laser source is fed into the optical fiber. Backscattered light from the fiber is fed through a Mach Zehnder interferometer and a 3×3 optical coupler to three detectors. In the Mach Zehnder interferometer the backscattered light is split and the split light is fed in parallel thorough two fiber branches of different optical length. The 3×3 optical coupler combines the light from the fiber branches with three different relative phase offsets. This makes it possible to compute phase measurements from the detected signals independent of fading effects in the backscattered signal.

EP2792996 also discloses a Mach Zehnder interferometer coupled to 3×3 optical coupler, be it for a different measurement Masoudi et al. disclose that for each respective time point as a function of time from transmission of the pulse, changes in the measured phase represents a phase change induced between Rayleigh scattering from a pair of points of the sensing fiber at a respective distance from the input side of the fiber. The phase change is directly related to the change in strain between the two points.

Masoudi et al. disclose measurement obtained when the fiber is subjected locally to temporally periodic strain variations at two positions along the fiber. A discrete Fourier transform was applied to measured phase values for successive pulses at the same time from transmission of the pulses. This yielded a plot of the Fourier transform phase as a function of the Fourier transform frequency and the time from transmission. This plot showed peaks at the Fourier transform frequency corresponding to the imposed vibration frequencies and the time from transmission corresponding to the distance to the location where the vibration was imposed.

Rayleigh backscattering has a low amplitude. On one hand this enables detection along a very long optical fiber. But on the other hand it necessitates Masoudi to use of optical amplifiers to amplify the emitted and backscattered light.

The spatial resolution of this measurement depends on the length of the pulse. Shorter pulses give better resolution. On the other hand, shorter pulses mean lower detectable optical energy and also affect the performance of certain phase detection technologies. Increasing the transmitted pulse intensity can lead to other problems, such as saturation of optical amplifiers used in the detection system and disturbance of the measurements of Rayleigh scattering due to inelastic scattering. As reported by S. P. Singh and N. Singh, in "Nonlinear effects in optical fibers: origin, management and applications" (Progress In Electromagnetics Research, PIER 73, 249-275, 2007) optical fibers produce inelastic scattering.

US2007165238 discloses an interferometric sensing arrangement includes with four lasers operating at different fixed wavelengths separated by a few nanometer. An optical coupler couples the multiple wavelength light to the interferometric sensor. The interferometric sensor uses interference between reflections from a fiber end face and a discrete reflector in the fiber. The different pulsed laser sources are used successively in time division multiplexing to measure the response at the different wavelengths. Difference ratios between measured intensities at different wavelengths are used as compensation for losses, e.g. due to fiber bending. Optical path lengths are determined based on measured amplitude responses.

US2007171402 discloses an optical sensing system that uses light scattered from a sensing fiber to sense conditions along the fiber. A receiver obtains a frequency of a Brillouin component of the received scattered light, to deduce the conditions.

EP0983486 discloses a system for measuring the strain in a structure using an optic fiber is incorporated in the structure like a building. The fiber contains a discrete interferometer positioned at a point where the strain is to be measured. A plurality of discrete sensing interferometers may be positioned along a length of optical fiber, each by means of pairs of reflectors created by prior local modification the refractive index of in the fiber. Path length changes in the interferometers are measured. Loss and temperature distributions are determined by detecting the Raman scattering spectrum.

SUMMARY

Among others, it is an object to provide for measurement of the location of property variation in an optical fiber that does not require high modulation frequencies.

A detection system for detecting a property of an optical sensing fiber as a function of position along the optical sensing fiber is provided. According to one aspect, the detection system comprises
  a light source configured to produce a light pulse comprising a plurality of laser modes at mutually different wavelengths simultaneously;
  an optical sensing fiber;
  a coupler having a coupler input coupled to the light source, a coupler input-output coupled to the optical sensing fiber and a coupler output;

a splitter with a splitter input, coupled to the coupler output, and a first and second splitter output an multi-way coupler, configured to produce combinations of light from a first and second input terminal of the multi-way coupler with respective different relative phase at a first, second and third output terminal, the first and second input terminal being coupled to the first and second output splitter, via a first and second optical path of different optical lengths respectively;

a first, second and third photo-detector, coupled to the first, second and third output terminal of the multi-way coupler respectively;

a data processing system coupled to receive output signals from the first, second and third photo-detector, data processing system being configured to compute, from the output signals, relative phase values of light from the first and second paths for a series of time points with time delays from transmission of the pulse that are smaller than a time needed for the light pulse to travel from the light source to an end of the sensing fiber and back to the first, second and third optical detectors.

The detection system measures an optical sum of the effect of the simultaneous wavelengths. Compared to use of a single wavelength, use of multiple simultaneous modes enables use of a higher total power and therefore better signal to noise ratio, which enables use of longer sensing fibers that produce significant attenuation. Use of multiple modes leaves it possible to detect local fiber property changes from phase measurements of elastically (Rayleigh) backscattered light using a multi-way coupler. When one or more optical amplifiers are used, use of multiple simultaneous modes makes it possible to provide higher light power before the same level of saturation effect is induced in the optical amplifiers and use of multiple modes reduces disturbance of detection signals by signals due to inelastic scattering. Preferably, a Mode-Locked-Laser (MLL) is used in the light source. Mode-Locked-Lasers are known per se. A Mode-Locked-Laser simultaneously emits light at a plurality wavelengths of which the phase of each wavelength is locked to each other. This makes it possible to use longer optical path length differences.

The fiber may be a fiber with macroscopically homogeneous optical properties, i.e. with optical properties that are the same everywhere along the length of the fiber on a macroscopic scale, without isolated discrete reflectors, and random microscopic variations that give rise to Rayleigh scattering, the random microscopic variations having the same macroscopic statistics along the fiber.

According to another aspect, backscattered light due to inelastic scattering in the sensing fiber is used to detect local property changes. The inelastic scattering may be Brillouin scattering or Raman scattering for example. Changes in inelastically scattered light are a direct result of local strain (Brillouin scattering) and temperature changes (Raman scattering). When inelastic scattering is used to detect fiber property changes, wavelength offset variation of the inelastically scattered light due to local fiber property changes may be measured as a function of time delay from a time of transmission of the pulse e.g. in the case of Brillioun scattering. Also inelastic backscatter amplitude may be measured as a function of time delay from a time of transmission of the pulse, e.g. in the case of Raman scattering. Use of inelastic scattering may provide for sensing different properties as a function of position in the optical sensing fiber and it may simplify some aspects of the measurements. By measuring the effects of Rayleigh scattering and/or Brillouin scattering in combination with Raman scattering, a combination of temperature and pressure effects can be determined with the same system.

Preferably, when inelastic scattering is used one or more blocking filter are used to block light from the wavelength(s) of the light source from reaching the detectors. Such blocking filters may be located anywhere in the path from the sensing fiber to the detectors, e.g. between the coupler that couples out light from the sensing fiber and the splitter, in which case only one filter suffices, and/or in the first and second optical light path to the multi-way coupler and/or between the multi-way coupler and the detectors. In an embodiment data processing system is configured to control tuning of the optical filter to wavelengths of Brillouin scattering and/or Raman scattering of light from the light source while blocking light at an emission wavelength peak of the light source. Thus for example a selection between measuring Raman scattering and Brillouin scattering can be made.

A single mode or multi-mode light source may be used for inelastic scattering. However, as reported in the article by S. P. Singh and N. Singh fibers may produce inelastic scattering also without strain or temperature variation. The distribution of high optical power over different wavelengths obtained by using multiple simultaneous modes reduces such non-linear optical effects in the sensing fiber. This provides for higher sensitivity to fiber property changes measured from local changes of inelastic scattering in the sensing fiber, e.g. due to strain or temperature changes.

In an embodiment the optical path length difference between the different optical paths is selected in accordance with the frequency difference between the different modes, so that phase shifts of the different modes after travelling along first and second optical path differ from each other substantially by an integer number of full circle phase shifts. This is the case if the product of the optical path length difference and the frequency distance FD between successive modes, divided by the speed of light c is an integer number. This has the effect that the optical path length difference does not affect the measured signals. As used herein, the optical path length is the product of the physical length of the path multiplied by the index of refraction of the medium through which the light travels in the path. As used herein, the optical path length is the product of the physical length of the path multiplied by the index of refraction of the medium through which the light travels in the path.

Preferably, a Mode-Locked-Laser (MLL) is used for the measurements of inelastic scattering. Mode-Locked-Lasers are known per se. A Mode-Locked-Laser simultaneously emits light at a plurality wavelengths of which the phase of each wavelength is locked to each other. At the same time, since the phase of the different wavelengths in the MLL is locked to each other, the relation between the phase differences of different modes are constant, which that reproducible phase detection using an interferometer and a 3×3 coupler can be used despite of multiple wavelength.

BRIEF DESCRIPTION OF THE DRAWING

These and other objects and advantageous embodiments will become apparent from a description of exemplary embodiments, by reference to the following figures.

DETAILED DESCRIPTION OF EXEMPLARY EMBODIMENT

Figure 1:
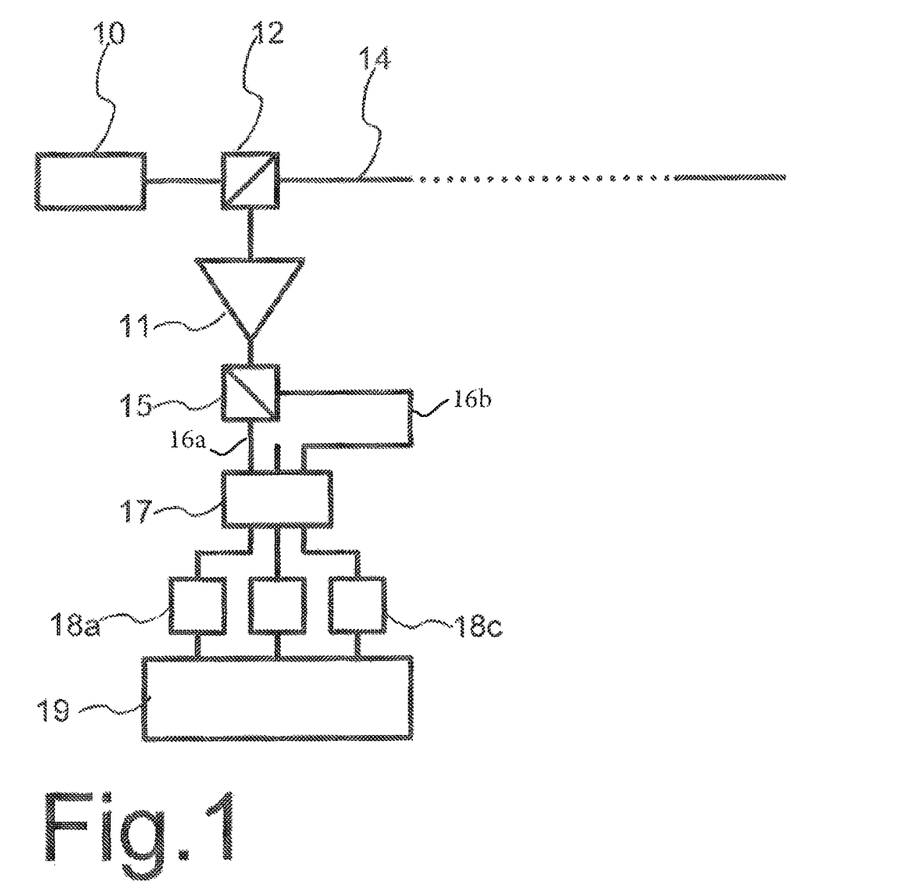
FIG. 1 shows an optical measuring system

FIG. 1 shows an optical measuring system. The general structure of this system is similar to that of the measuring system described in EP13164178, with as measuring element an interferometer formed by a first and second light path 16a,b of different optical length. In an embodiment the light paths may be formed by a first and second optical fiber of different optical length. The interferometer comprises a splitter 15 with outputs coupled to inputs of the first and second light path 16a,b, a multi-way coupler 17 with a first and second input coupled to outputs of the first and second light path 16a,b respectively. First, second and third outputs of multi-way coupler 17 are coupled to respective photo-detectors 18a-c.

Furthermore, the optical measuring system comprises a pulsed light source 10, an optical amplifier 11, a coupler 12 and a sensing fiber 14. Optionally, optical amplifier 11 may be omitted.

Pulsed light source 10 may comprise a Mode-Locked-Laser (MLL) (e.g. an MLL followed by a pulse generator such as a shutter). Furthermore, pulsed light source 10 may comprise a wavelength conditioning filter. A fiber Bragg grating (FBG) may be used as a wavelength conditioning filter for example. The wavelength conditioning filter may be used to select a center wavelength and wavelength range of the pulse.

Figure 1A:
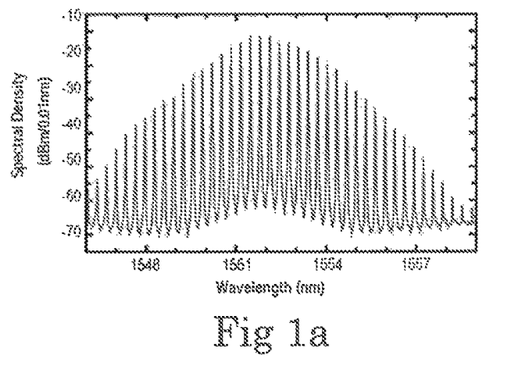
FIG. 1a shows an exemplary spectrum of a Mode-Locked Laser

Mode-Locked-Lasers are known per se. FIG. 1a shows an exemplary spectrum of a Mode-Locked-Laser. The optical frequency separation between the wavelengths is typically in the order of 10 GHz which is about 0.08 nm at about 1550 nm. The spectral envelope of the multiple wavelength is significantly broader than that of a single wavelength. The envelope spectrum with about 20 wavelengths in the Full Width Half Maximum (FWHM) has for example a width of about 200 GHz which corresponds to about 1.6 nm. The coherence length of a light source is inversely proportional to the spectral bandwidth. However, due to the multiple-wavelength which are phase locked in the Mode-Locked-Laser, the coherence function is a recurrent function in the space domain.

Pulses of light from the mode locked laser may be formed by operating the mode locked laser in a pulsed mode, or by passing continuous light from the mode locked laser only during pulse intervals. In the pulsed mode, wherein the mode locked laser starts and ends generation at the start and beginning and end of the pulse intervals, the individual pulse of a model locked laser may have a continuous spectrum, discrete mode wavelengths only becoming distinguishable from a series of pulses. Because simultaneous discrete wavelengths rather than a continuous spectrum are needed to detect changes of Rayleigh scattering as a function of position, use of an MLL followed by a pulse generator (e.g. a pulse shaper) is preferred for generating the pulses.

Pulsed light source 10 has an output coupled to a first end of sensing fiber 14 via coupler 12. Optionally, an optical amplifier may be coupled between pulsed light source 10 and first end of sensing fiber 14 to increase the available optical power. The first end of sensing fiber 14 is coupled to the splitter 15 at the input of the interferometer via coupler 12 and optical amplifier 11. Coupler 12 may be an optical circulator. Outputs of photo-detectors 18a-c are coupled to a data processing system 19, which is further coupled to pulsed light source 10 to synchronize data capture from photo-detectors 18a-c to pulse transmission by pulsed light source 10.

Photo-detectors 18a-c may comprise analog to digital converters, so that they will provide digitized measurements to data processing system 19. Optionally, a further coupler and a further detector (not show) may be provided to provide pulse sync signals to data processing system 19. Such a further coupler being located in the optical path from light source 10 to sensing fiber 14, with an output to couple a small fraction of the light from that optical path to the further detector, which in turn has an output coupled to data processing system 19. Data processing system 19 may comprise a programmable computer programmed with instructions to perform the functions described for it herein. The instructions for the programmable computer may be provided in a computer readable medium, such as a magnetic or optical disc or a semi-conductor memory, e.g. a non-volatile semi-conductor memory.

In operation, a light pulse from light source 10 travels into sensing fiber 14 via coupler 12. Within sensing fiber 14 this gives rise to time continuous return light, due to scattering throughout sensing fiber 14. This includes primarily return light due to Rayleigh scattering, but it may also include return light due to inelastic scattering like Brillouin scattering and Raman scattering. Coupler 12 feeds the return light to splitter 15 via amplifier 11. As a function of time T after transmission of a light pulse from light source 10, the return light at splitter 15 comes from positions within sensing fiber 14 at increasingly larger distances D from the input of sensing fiber 14 (T=2*D/c, where c is the speed of light in sensing fiber 14). The amplitude of the detected reflected light varies with time (i.e. with distance from the point of reflection). Use of a multi mode laser (MLL) light source enables higher output optical power generation when an optical amplifier is used between light source 10 and coupler 12 and/or may reduce saturation effects in optical amplifier 11, when it is used. Furthermore, non-linear effects of sensing fiber 14 may be reduced.

Splitter 15 splits the return light and feeds the split light into first and second light path 16a,b, from where the splitted parts are fed to multi-way coupler 17.

Multi-way coupler 17 is known per se. It output combinations of first and second light components derive from light from the first and second input to the first, second and third outputs. In the combinations at each of the respective outputs multi-way coupler 17 adds a respective different known relative phase differences between the first and second light components.

As is known per se, for light at a single wavelength the intensity of the combination of light detected by a detector 18a-c comprises parts that depend on the amplitudes of first and second components individually and a part that is proportional to the product of the amplitudes of the first and second components and the cosine of the relative phase of the first and second components at the detector. When at least three such detected intensities are available, each with an added different relative phase, the original phase difference between the light from the first and second input can be computed in absolute terms, by mathematically solving the phase difference from the at least three such detected intensities.

Such a multi-way coupler may be realized for example by using a first, second and third optical fiber in parallel next to each other, arranged so that part of the light in the fibers is transferred between the fibers. In this case, first ends of the first and third optical fiber may be used as inputs, and opposite ends of the optical fibers may be used as outputs. Although a three way coupler will be used in the exemplary embodiments, it should be realized that any N-way coupler with N>3 may be used instead. Although optical fiber will be used in the exemplary embodiments, it should be realized that other optical waveguide technology based N-way coupler may be used instead.

Data processing system 19 is configured to perform such a computation of the original phase difference wherein the dependence on the amplitudes is eliminated. Data processing system 19 receives measurements from detectors 18a-c for a quasi continuous series of time points and computes the original phase difference for each of these time points. Data processing system 19 relates the time points to time delay from a time of transmission of the pulse, e.g. from its time of transmission by light source 10 or its time of transmission into sensing fiber 14 or any other reference point. The time of transmission of the pulse may be determined e.g. from the time of transmission of a trigger signal to light source to trigger the pulse, or from the time of detection of transmission of the pulse.

Thus, phase differences as a function of time delay from a time of transmission of the pulse are computed, The phase computation need not be performed in real time: the measurements from detectors 18a-c for the series of time points may all be stored in a computer memory e.g. RAM or a storage device (not shown) and used for computation later.

Except for the use of a pulsed multi-mode laser light source, the structure of the present system is similar to that of EP13164178, but the timing and path lengths differ. The optical measuring system of EP13164178 is designed to use the computed phase difference to measure the distance between the output of an optical fiber (at the position corresponding to that of sensing fiber 14), and an object surface beyond that optical fiber. EP13164178 uses reflections from the tip of the optical fiber and from the object, as received back into the optical fiber. It measures interference between these reflections, i.e. from light that has had time to travel from light source 10 to the end of sensing fiber 14 and beyond to an object and back through sensing fiber. EP13164178 operates independent of travel time in optical fiber 14. It does not need to use pulses, but if it did, the delay between the pulse and detection would need to be sufficient to allow for travel back and forth through the entire fiber.

Unlike this, the present invention uses light that has not had the time to travel to the end of sensing fiber 14 and reflected back by the rear end of the sensing fiber 14, and more generally for time points at which no reflection of the pulse from a discrete reflector is received, such as from the tip of the fiber. In EP13164178 the length of the sensing fiber is a matter of convenience to locate its end near the object. The present invention uses a very long sensing fiber of at least ten meter and optionally more that a hundred or a thousand meters long. In EP13164178 the different length first and second light paths 16a,b are used to maintain coherence between light reflected at the output of the fiber and light reflected from the object: the optical length difference is selected substantially equal to twice the distance between the tip of the optical fiber and the object.

In the present optical measuring system, the path length difference is used to ensure that detectors 18a-c measure interference between light reflected from different ranges of positions in sensing fiber 14 and/or to measure the wavelength of inelastically scattered light. The phase relation between scattered light from pairs of such ranges of positions within sensing fiber 14 is measured as a function of distance of the pair from the input of sensing fiber 14. In other embodiments the wavelength of scattered light is measured as a function of time, which corresponds to travel distance of the scattering position from the input of sensing fiber 14.

Data processing system 19 receives measurements from detectors 18a-c for a series of time points after transmission of a pulse. Preferably, this is repeated for a number of pulses. Different time intervals between transmission of a pulse and reception at the detector correspond to scattering at different locations within sensing fiber 14. The fiber may be between ten meter and 10 kilometer long for example, which corresponds to reception in time intervals of zero to a tenth of a microsecond and zero to a millisecond after the pulse respectively. The time points of the series at which detector output signals are sampled after a pulse is transmitted may be evenly spaced within this time interval, for example every nanosecond (as noted, data processing system 19 need not perform the computation in real time). Data processing system 19 computes the phase difference between light into first and second light path 16a,b, for each of these time points.

In a first embodiment the system is used to measure phase differences between scattering (e.g. Rayleigh scattering) received from pairs of positions along sensing fiber 14. The scattering is a random function of position along fiber 14, but as long as fiber 14 is not strained pulses transmitted at different time points will have scattering with the same phase at the same position despite the random nature of scattering=.

The transmitted pulse has a finite duration. This means that the return light from fiber 14 at a given time point is an aggregate (mathematically an integral) of scattering from a range of positions within fiber 14. Absent strain this results in a fixed aggregate scatter phase at the same given time point after each pulse.

The measured phase difference at a time point corresponds to the phase difference between scattering from two ranges of positions at an optical distance from each other that corresponds to half the difference L1–L2 between the optical lengths of first and second light path 16a,b. Like the scattering as a function of position, this measured phase difference is a random function of position when the length difference L1–L2 between first and second light path 16a,b is larger than the optical length of the pulse (if the length difference is smaller, there is partly correlated scattering).

In an embodiment, the length difference L1–L2 is at least equal to the optical length of the pulse, and more preferable at least twice the optical length of the pulse (as used herein the optical length of a path is the product of the physical length of the path multiplied by the index of refraction of the medium through which the light travels in the path). Preferably the difference between the optical lengths of first and second light paths 16a,b does not exceed the pulse duration P, measured in terms of optical length (the speed of light times the duration in terms of time), by more than a factor ten. This ensures high spatial resolution with sufficient optical power for the detectors.

Local strain on fiber 14 results in a local change of this measured phase function, at a time delay after transmission of the pulse that has a one-to-one relation to the distance along the fiber to the location of the local strain. At least when a single mode laser is used as a light source the size of the measured phase change corresponding to a given amount of strain is independent of the optical amplitude in sensing fiber 14 at the location of the strain. Therefore, amplitude decrease along sensing fiber 14 does not affect the phase response to strain.

Changes in the phase can be detected e.g. by comparing the measured phase with a reference (e.g. a measured reference signal), or by monitoring AC components of signals obtained as phase measurements at the same time delay after transmission of successive pulses from time delay at which such changes occur the position of the local strain can be estimated.

For example, pulse durations that correspond to pulse lengths of between 0.1 meter and 2 meters in sensing fiber may be used, with at least that difference between the optical lengths of first and second light paths 16*a,b*. If the speed of light in sensing fiber 14 is about ⅔ of the speed of light in vacuum, this corresponds to pulse durations of 0.5-10 nanoseconds. The pulse duration determines the spatial detection resolution which is preferably less than one meter. When a light source with multiple wavelength components is used, the output signals of the detectors 18*a-c* are each a sum of single wavelength contributions from the different wavelength components. Local strain in sensing fiber shifts the phase of each of these contributions by the same amount. The effect of this can be measured from the phase computed using the photo-detectors 18*a-c*. Therefore, the size of the measured phase change corresponding to a given amount of strain is also substantially unaffected by relative amplitude variations of the modes along sensing fiber 14.

In a second embodiment use is made of Brillouin scattered signals to measure the strain in the fiber. As known per se, Brillouin scattering of incoming light with a first wavelength (or more precisely a first optical frequency) results in a spectrum of scattered light, with a power density distribution of back reflected light that has peaks at shifted wavelengths (optical frequencies) on opposite sides of the first wavelength. The amount of optical frequency shift depends on the strain in the fiber.

Figure 2:
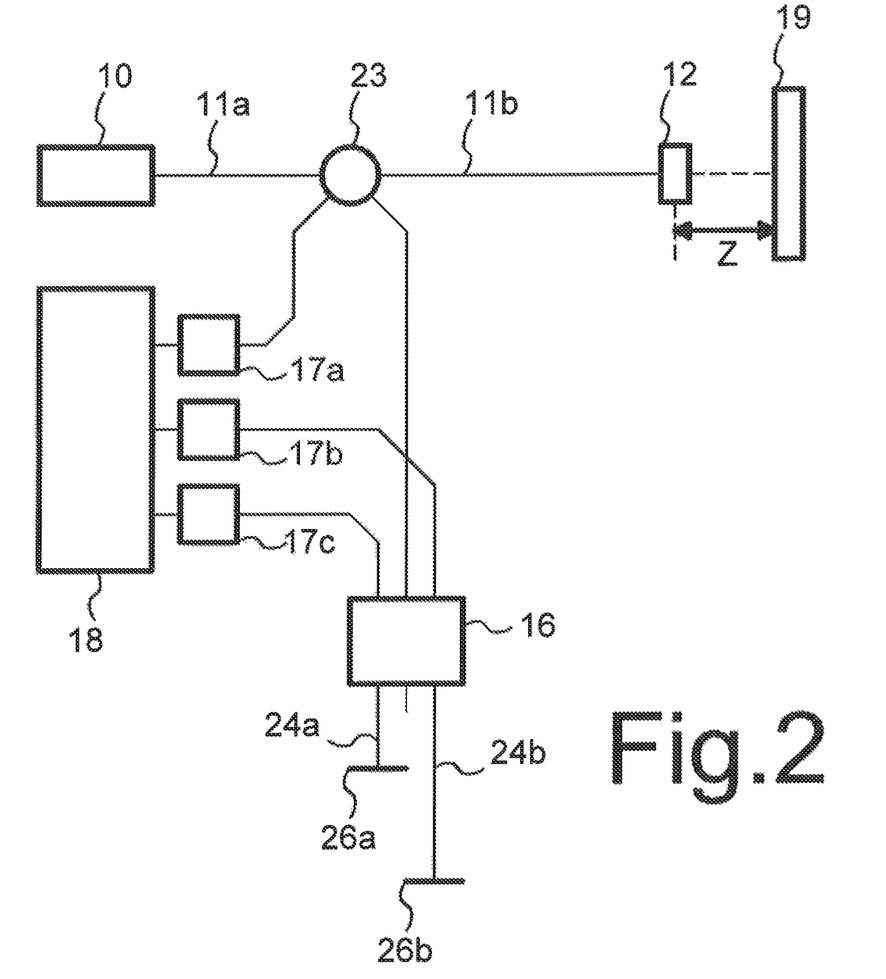
FIG. 2 shows a further optical measuring system

FIG. 2 shows an embodiment of the optical measuring system for use to determine the Brillouin shift. In comparison with the optical measuring system of FIG. 1, an optical filter 20 has been added between coupler 12 and splitter 15. In this embodiment, light source 10 preferably comprises a laser that defines the spectrum of the emitted light, with a peak at a laser wavelength. Optical filter 20 is used to block light from that peak. Optical filter 20 may be a tunable filter, data processing system 19 may have an output coupled to a tuning control input of optical filter 20. Optionally an optical amplifier may be added between coupler 12 and splitter 15, preferably behind optical filter 10. Optionally, an MLL may be used as light source 10. When an MLL reduces is used, this reduces non-linear optical effects in the sensing fiber with higher output power generation by the first optical amplifier.

In a first embodiment, optical filter 20 may be a wavelength selective blocking filter, with a blocked wavelength band that contains the laser peak wavelength, or a tunable blocking filter that is tuned to block the laser peak and pass wavelengths of Brillouin scattered light. In a second embodiment, optical filter 20 may be a band pass filter, with a pass band that passes Brillouin scattered light and does not overlap the laser peak. In a further embodiment, optical filter 20 is a tunable band pass filter. Although optical filter 20 is shown as a box for the sake of illustration, it may in fact be realized as a fiber Bragg grating in an optical fiber coupled between coupler 12 and splitter 15. Such an optical filter may be tuned by varying the strain in the fiber part that contains the fiber Bragg grating.

In the embodiment of FIG. 2, the optical path length difference (OPD) between first and second light path 16*a,b* is selected to enable measurement of the Brillouin wavelength shift from the phase difference measured using multiway coupler 17. After a time delay T from transmission of the pulse by light source 10, this phase difference is proportional to the path length difference between first and second light path 16*a,b* divided by the wavelength of the Brillouin scattered light. For a fixed path difference, variation in the wavelength of the Brillouin scattered light along the sensing fiber results in changes in the phase difference at the end of the optical paths.

Use of a large OPD may decrease sensitivity or even fade out the interference signal due to decreasing coherence of the interfering light. For a pulse with a continuous spectrum with a bandwidth of about 1.6 nm, the allowable OPD in the interferometer to ensure significant visibility of the interference signal (a loss factor due to halving of coherence) would be in the order of 5 mm. This limits the sensitivity of the interferometer to detect wavelength shift via the phase change since the derivative of the phase shift with respect to the wavelength shift is equal to the OPD multiplied by two Pi divided by the square of the wavelength.

Use of a multi-mode laser like a Mode Locked Laser (MLL) with multiple wavelength peaks allows the use of a larger OPD to increase the sensitivity of wavelength shift detection in comparison with a light source with the same spectral bandwidth as the envelope of the MLL spectrum. The MLL spectrum has multiple wavelength peaks with a constant optical frequency separation Df between successive peaks. When the light components at the different wavelength in the MLL are in locked phase relations to each other, the coherence function of the spectrum corresponds to the inverse of the width of the individual peaks.

Preferably, the OPD is selected so that the phase shifts of the different modes after travelling along the OPD differ from each other substantially by an integer number of full circle phase shifts, i.e. OPD is substantially equal to n*c/Df, wherein n is any integer, c is the speed of light in the optical path and Df is the optical frequency difference between successive modes. This ensures that the relative size of the amplitudes of the different modes does not affect the phase measurements. For a Df of about 10 GHz, the periodicity c/Df is about 30 mm. As a result, the OPD of the detection interferometer can be set to 30 mm or even 60 mm to increase the sensitivity.

Data processing system 19 computes phase difference values for a series of time points after transmission of the pulse by light source 10, from the output of photo-detectors 18*a-c* at those time points, the time points lying before the time point at which light that has traveled from light source 10 through sensing fiber 14 to the end of sensing fiber 14 and back to photo-detectors 18*a-c* reaches photo-detectors 18*a-c*.

Differences between of the phase values for the time points and a base line value are related to the strain change and hence of change in pressure or other physical parameters that induce length changes or refractive index changes in the sensing fiber 14 at different locations along sensing fiber 14. For a time point at a delay T after transmission of the pulse by light source 10, the location on sensing fiber 14 corresponds to a distance of c*T/2, from light source 10, where c is the speed of light in sensing fiber 14. Optionally, data processing system 19 may convert the phase values into wavelength values, or use any other type of values that vary in correspondence with the phase values.

If optical filter 20 is a tunable, it is tuned to block the wavelength peak from light source 10 and pass at least part of the wavelengths of Brillouin scattered light. If optical filter 20 passes only part of the wavelengths of Brillouin scattered light, data processing system 19 may be configured to control optical filter 20 to vary the tuning to pass different parts of the wavelengths of Brillouin scattered light successively, and to perform repeated measurements of the phase shift for the series of time point, for different pass band settings.

In a further embodiment use may be made of Raman scattered light. Like Brillouin scattering, Raman scattering results in returned light at wavelength that are offset with respect to the wavelength(s) of light source 10. Raman wavelength shift is generally much larger than Brillouin wavelength shift. The amplitude of Raman scattering varies mainly in response to temperature variations in sensing fiber 14, and not or much less in response to strain as in the case of Brillouin wavelength shift. The amplitude of the Raman scattering can be measured from a amplitude of the detector signals or derived by combining the detector signals, for example by taking a sum of the detector signals from detectors 18a-18c.

In the embodiments wherein Raman scattering is used, data processing system 19 may be configured to control optical filter 20 to pass wavelengths of Raman scattered light, blocking wavelengths of the laser peak and Brillouin scattering. In a further embodiment, data processing system 19 may be configured to provide for measurement of both amplitude of the Raman scattering and wavelength (as measured from the phase value) of the Brillouin scattering, by tuning optical filter 20 to pass wavelengths of Raman scattered light and Brillouin scattered light in different time intervals, use light pulses from light source 10 that result reflection from sensing fiber 14 in these time intervals respectively and to determine the amplitude variation and the phase shifts for series of time delays from transmission of the pulse in these respective time intervals.

Measurement results as a function of position along sensing fiber 14 obtained by Raman scattering or Brillouin scattering may be used to correct the relation between position in optical sensing fiber 10 and time delay from the time of transmission of the pulse. This relation may depend on fiber temperature. By using Raman scattering measurements to determine temperature or temperature deviations as a function of position and a predetermined relation between temperature changes and fiber length changes, data processing system 19 may compute the cumulative effect of length changes along optical sensing fiber 14 on the time delay. Data processing system 19 may use this to correct the positions associated with time delays after the pulse at which changes of Rayleigh and/or Brillouin scattering was detected. In this way, positions where these effects occur may be determined more accurately.

Measurement results as a function of position along sensing fiber 14 obtained by two or more of Rayleigh scattering, Brillouin scattering and Raman scattering may be combined, e.g. as a sum of these measurement results, each multiplied by a respective factor. This may be used to remove dependence on a physical parameter like temperature from the combination. Suitable factors may be selected experimentally, or based on known dependence of the measurement results on different physical parameters.

The invention claimed is:

1. A detection system for detecting a property of an optical sensing fiber as a function of position along the optical sensing fiber, the detection system comprises
    a light source configured to produce a light pulse comprising a plurality of laser modes simultaneously at mutually different wavelengths, wherein the light source comprises a mode locked laser with modes spaced apart by a frequency distance Df;
    an optical sensing fiber;
    a coupler having a coupler input coupled to the light source, a coupler input-output coupled to the optical sensing fiber and a coupler output;
    a splitter with a splitter input, coupled to the coupler output, and a first and second splitter output
    an multi-way coupler, configured to produce combinations of light from a first and second input terminal of the multi-way coupler with respective different relative phase at a first, second and third output terminal, the first and second input terminal being coupled to the first and second output of the splitter, via a first and second optical path of different optical lengths respectively, a difference between optical lengths in the first and second optical paths being substantially an integer multiple of the speed of light divided by the frequency distance Df;
    a first, second and third photo-detector, coupled to the first, second and third output terminal of the multi-way coupler respectively;
    a data processing system coupled to receive output signals from the first, second and third photo-detector, the data processing system being configured to compute, from the output signals, relative phase values of light from the first and second paths for a series of time points with time delays from a time of transmission of the pulse that are smaller than a time needed for the light pulse to travel from the light source to an end of the optical sensing fiber and back to the first, second and third optical detectors.

2. A detection system according to claim 1, comprising a pulse generator coupled between the mode locked laser and the coupler.

3. A detection system according to claim 1, wherein the optical lengths of the first and second optical path differ by an optical path length difference, the optical path length difference being larger than an optical length corresponding to a product to the speed of light and a duration of the light pulse.

4. A detection system according to claim 1, comprising an optical filter coupled between the coupler and the splitter, and/or optical filters coupled in series with the first and second light paths and/or between the output terminals of the multi-way coupler and the photo-detectors, the optical filter being a band blocking filter, configured to block light at an emission wavelength peak of the light source.

5. A detection system according to claim 4, wherein the optical filter is a tunable filter and the data processing system is configured to control tuning a pass band of the optical filter to include wavelengths of Brillouin scattering and/or Raman scattering of light from the light source.

6. A detection system according to claim 1, wherein the difference between optical lengths in the first and second optical paths is equal to the speed of light divided by the frequency distance Df or twice the speed of light divided by the frequency distance.

7. A detection system according to claim 5, wherein the data processing system is configured to compute, from at least one or a combination of the output signals, Raman scattering amplitudes for said series of time points.

8. A detection system according to claim 1, wherein the optical sensing fiber is located underground and has a length of more than 10 meters.

9. A detection system according to claim 1, comprising an optical amplifier coupled between the light source and the coupler.

10. A detection system according to claim 1, comprising an optical amplifier coupled between the coupler and the splitter.

11. A method of detecting a property of an optical sensing fiber as a function of position along the optical sensing fiber, the method comprising
    transmitting a light pulse comprising a plurality of simultaneous laser modes at mutually different wavelengths into the optical sensing fiber, wherein the light pulse is generated using a mode locked laser with modes spaced apart by a frequency distance DF;

feeding light produced by backscattering of the light pulse in the optical sensing fiber to a multi-way coupler, via a first and second optical path of different optical lengths respectively, a difference between optical lengths in the first and second optical paths being substantially an integer multiple of the speed of light divided by the frequency distance DF, the multi-way coupler comprising a first, second and third output terminal, for producing combinations of light from the first and second optical path with respective different relative phases;

detecting intensities of the combinations at the first, second and third output terminal of the multi-way coupler respectively;

computing, from the output signals, relative phase values of light from the first and second paths for a series of time points with time delays from a time of transmission of the pulse that are smaller than a time needed for the light pulse to travel from the light source to an end of the optical sensing fiber and back to the first, second and third optical detectors.

12. A detection system according to claim 8, wherein the optical sensing fiber is located underground and has a length of more than 100 meters.

13. The method of claim 11, wherein the mode locked laser is followed by a pulse generator, the pulse generator generating the light pulse from light from the mode locked laser.

14. The method of claim 11, comprising using an optical filter to block light at an emission wavelength peak of a light source from being fed to detectors used to perform said detection of the intensities, the optical filter being a tunable filter, the method comprising tuning a pass band of the optical filter to include wavelengths of Brillouin scattering and/or Raman scattering of light from the light source.

15. The method of claim 11, wherein the difference between optical lengths in the first and second optical paths is equal to the speed of light divided by the frequency distance Df or twice the speed of light divided by the frequency distance.

* * * * *